United States Patent
Zimniewicz et al.

(10) Patent No.: US 6,698,018 B1
(45) Date of Patent: Feb. 24, 2004

(54) SYSTEM AND METHOD OF MULTIPLE-STAGE INSTALLATION OF A SUITE OF APPLICATIONS

(75) Inventors: Jeff A. Zimniewicz, Bellevue, WA (US); Ryan Helgeson, Kirkland, WA (US); Phillip J. Marino, Dublin, OH (US); Crista E. Johnson, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/567,732

(22) Filed: May 10, 2000

(51) Int. Cl.[7] .............................. G06F 9/445; G06F 9/44
(52) U.S. Cl. ........................ 717/175; 717/169; 717/171; 717/176
(58) Field of Search ................................ 717/168–178, 717/122; 707/203

(56) References Cited

U.S. PATENT DOCUMENTS

| | | | |
|---|---|---|---|
| 5,835,777 A | * 11/1998 | Staelin et al. | 717/175 |
| 5,859,969 A | * 1/1999 | Oki et al. | 717/178 |
| 5,950,010 A | 9/1999 | Hesse et al. | |
| 5,960,204 A | 9/1999 | Yinger et al. | |
| 5,966,540 A | 10/1999 | Lister et al. | |
| 6,081,263 A | * 6/2000 | LeGall et al. | 709/203 |
| 6,134,593 A | 10/2000 | Alexander et al. | |
| 6,178,551 B1 | * 1/2001 | Sana et al. | 717/140 |
| 6,279,154 B1 | 8/2001 | Davis | |
| 6,282,711 B1 | 8/2001 | Halpern et al. | |
| 6,327,705 B1 | 12/2001 | Larsson et al. | |

OTHER PUBLICATIONS

Plumley, "Documented Backoffice", John Wiley & Sons, Inc. 1998.

*Smart Update Developer's Guide*, "Chapter 4 Writing an Installation Script", available at http://developer.netscape.com/docs/manuals/communicator/jarman/install.htm, accessed Jan. 15, 2001.

* cited by examiner

Primary Examiner—Antony Nguyen-Ba
(74) Attorney, Agent, or Firm—Leydig, Voit & Mayer, Ltd.

(57) ABSTRACT

A multiple stage installation system for the installation and setup of a suite of applications segregates and organizes the preparation, installation, clean up, optimization, etc. into functional groupings that define the multiple stages of the installation process. These functional groupings include actions to be performed on behalf of and to any and all of the applications to be installed. While different stages may be defined, the system preferably includes a pre-install phase, an install phase, and a post-install phase during which different functional activities are performed. An optimization phase may also be included to allow optimization of applications that have already been installed. In a preferred embodiment, the applications to be installed implement a COM interface that contains a method for each stage supported. The core installation system determines the installation order for the applications, acquires the COM interface from the application, and for each install stage, calls the appropriate method on that interface. Each application's method for a given stage is called before any methods of any applications for the next stage.

14 Claims, 7 Drawing Sheets

SYSTEM AND METHOD OF MULTIPLE-STAGE INSTALLATION OF A SUITE OF APPLICATIONS

TECHNICAL FIELD

This invention relates generally to systems and methods for installing application program suites and, more particularly, relates to the ordering and actual execution of various install actions necessary to accomplish the installation of a suite of application programs.

BACKGROUND OF THE INVENTION

With the continued growth and specialization of various software applications for both business and residential users, software original equipment manufacturers (OEMs) and secondary value added providers (VAPs) have begun selectively combining these applications into suites. The selection of the particular applications to include in a suite is made based on certain synergies desired to be achieved for a particular customer or group of customers. In this way a business customer, for example, may purchase a single suite that provides all of the applications to allow complete productivity for all of the functions that are normally performed in the business environment. This selection and grouping process by the OEMs and/or the VAPs greatly simplifies the decision process at the user level, and typically allows for a common user experience across applications since typically all applications will be from a particular OEM.

Another advantage provided by a suite of applications exists at the system administration level. Unlike the requirement of having to separately install and setup each individual application, entering the same user information over and over for each application, the installation of a suite is much more integrated. Most suites employ an installation wizard of some sort that installs and sets up all of the applications within the suite at one time. While this presents a distinct advantage over the individual application installation and setup, the structure of modern suites present problems for current installation processes.

A typical installation process for these suites begins by installing one of the applications in its entirety, moving to the next, installing it completely, moving to the next, and so on until the entire suite is installed. While this worked fine for some of the earliest suites, dependencies and other required relationships between applications in more modern suites have made this simple model much more complex. Further, some applications required that certain initialization or cleanup steps be performed for proper installation. To accommodate these, application developers were forced to either place these steps into the core setup modules or add additional setup modules to the suite itself. This has proven very costly in terms of maintenance.

Additionally, since one application was "finished" before the next application began its installation, the optimization steps that were performed at the end of the installation of the earlier applications could be rendered moot by the further installation of another application. In these cases, users were forced to go back and essentially reinstall the application whose optimization was disturbed to ensure that the system would operate correctly. This, obviously, did not find favor with users. Further, some applications would not fully complete their installations, or their installations would perform actions that would prevent other applications from installing correctly. In these situations, the adversely affected applications needed to compensate by performing actions that enabled them to complete correctly. This too was costly and added additional complexity to the system.

While many suites comprise a group of separate applications bundled together forming, in essence, an aggregation of applications as discussed above, more advanced and sophisticated suites are actually comprised of a multitude of inter-dependent applications. Indeed, many of the application programs themselves are actually minisuites of related or complementary applications integrally operating as a "single" application. Unfortunately, these mini-suites present problems that are additional and unique from those already discussed for the current installation and setup technology.

Specifically, each mini-suite application may include a different version of a member application (one of the applications that make up the mini-suite application). As such, the installation of the first mini-suite may result in the installation of, e.g., version 2.0 of a particular member application. When the second mini-suite application is installed, it may have as a member application version 1.5 of that same particular member application installed as part of the prior installation. Unfortunately, the current installation technology typically replaces the newer version that was installed first with the older version. This may have an adverse effect on the first installed mini-suite since it may require functions only available in the newer version of the member application. In this situation the final installed configuration of the overall suite may not include the correct or latest version of an application if a later-installed application overwrote it with an earlier version.

In addition to these problems, which may be seen for most suite installations, an additional user experience problem exists in large and complex enterprise system installations. In these enterprise system installations the installation and configuration process may take several hours to complete and may involve several hundred megabytes of code and data installation and setup. It is common practice with these installations, since they are so time consuming, for the system administrator to begin the installation process late in the day, supply the required information as queried by the system, and go home to allow the installation to proceed overnight. Unfortunately, it is often the case that the installation may be stopped at various points to query for additional user input, often several hours apart. As a result, the suite administrator is really unable to begin a long installation and allow it to run overnight or during another unattended period because it is not known when the installation will halt to ask for further user input. This requires that the administrator continuously monitor the entire installation process (which could take upwards of ten hours or more to complete) so that undue stoppages while the system awaits user input does not occur.

There, therefore, exists a need in the art to overcome these and other problems existing with the current state of suite installation programs.

SUMMARY OF THE INVENTION

The inventive concepts of the instant invention relate to setup and installation applications, and more particularly to setup and installation wizards for application program suites. Specifically, the concepts disclosed in this case facilitate the installation of the several components of a suite of server applications by dividing the installation into multiple parts or stages. Each of these multiple stages is executed in a specific sequence, in a known fashion, and allows the interleaving of required actions from the individual applications. Preferably, these stages comprise three stages, e.g. pre-install, install, and post-install, although additional stages, e.g. optimization, etc., may also be included.

In the system of the instant invention, the problems discussed above are overcome by dividing the entire installation process into these various stages, and grouping the activities for each stage for all applications together. The work to be performed in each stage is accomplished in a logical manner, as opposed to being tied to the start and finish of a particular sequence of applications. This allows the maintenance of proper dependencies, proper component version installation, one time optimization initiation, etc.

To accomplish these benefits in accordance with the instant invention, each component to be installed implements a specific component object model (COM) interface that contains a method or function for each setup stage supported. In a preferred embodiment, an initial pre-install stage is defined during which all of the applications complete their user-interaction and querying functions. Additionally, the core setup application receives and verifies component availability and version requirements, dependency verification, preliminary file copy operations, some system configuration setting, etc. The second stage in the preferred embodiment is the install stage, during which the applications are actually installed and setup on the computer. During the third phase, post-install, any clean-up activity, version update, wizard optimization, etc. takes place. Additionally, any necessary or desired rollback activity is accomplished during this stage. A separate optimization phase may be included depending on the overall nature and complexity of the functions to be performed in the third phase.

In an alternate embodiment, the core setup installation application queries the components themselves to determine what install states they support. The core setup application of the instant invention determines the installation order for the components, acquires the COM interface from the component, and for each install stage, calls the appropriate method on that interface. Each component's method for a given stage is called before any methods or any components for the next stage are called.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
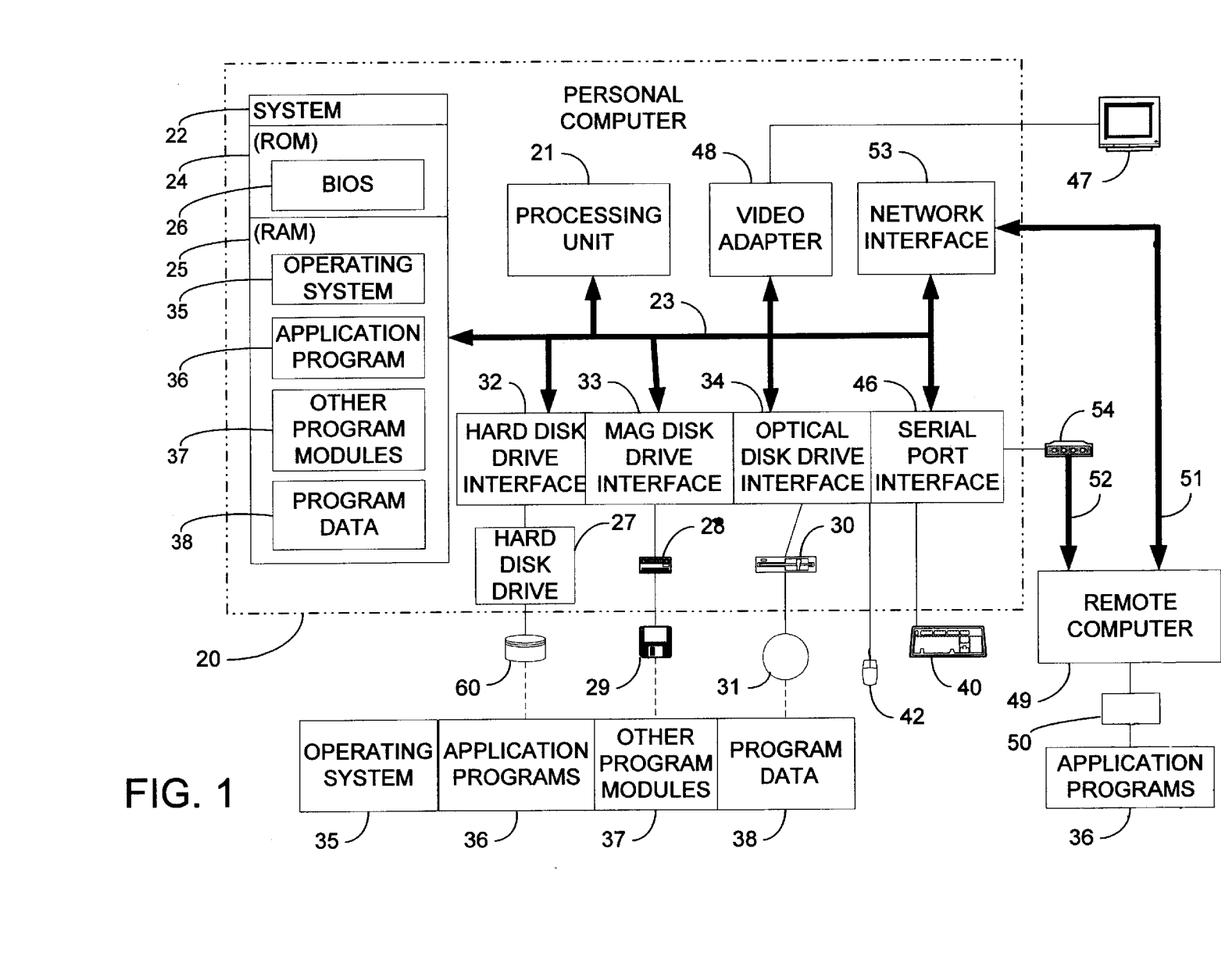
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk. drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In accordance with the invention, a system and method are presented that allows the segregation of different functional installation phases for the installation of multiple application programs in a suite. This system is embodied in a Suite Integration Toolkit (SIT) and utilizes a common architecture used for a setup database file (setup.sdb) to identify components having actions to be performed during each stage. SIT facilitates this functional parsing of the overall installation and setup of multiple applications in a suite by providing a generic solution to the problem of integrating multiple setups (e.g. a box containing OS, IE, MMC, server app, etc.) into a single, concise, unified setup. This setup has well defined phases during which different classes of actions may be performed. SIT complements, but does not replace, existing installer technology. SIT works as an integration layer for disparate setups but does not perform core setup tasks such as file copy, registry operations, etc., although it may be expanded to do so if desired.

In addition to addressing existing installation issues as discussed above, SIT also preferably provides a flexible and extensible COM layer for applications that want to hook into setup. This allows these applications to modify the UI, launch additional processes during the particular phases of setup, or install components that have previously been downloaded to a central directory on the local machine. Further, application can also hook in from other media (i.e. third party DVD, CD, etc.), as well as from a networked machine. While significant advantages are presented when SIT is COM based, one skilled in the art will recognize that SIT may be programmed using other technology without departing from the scope or spirit of the teachings herein.

Figure 2:
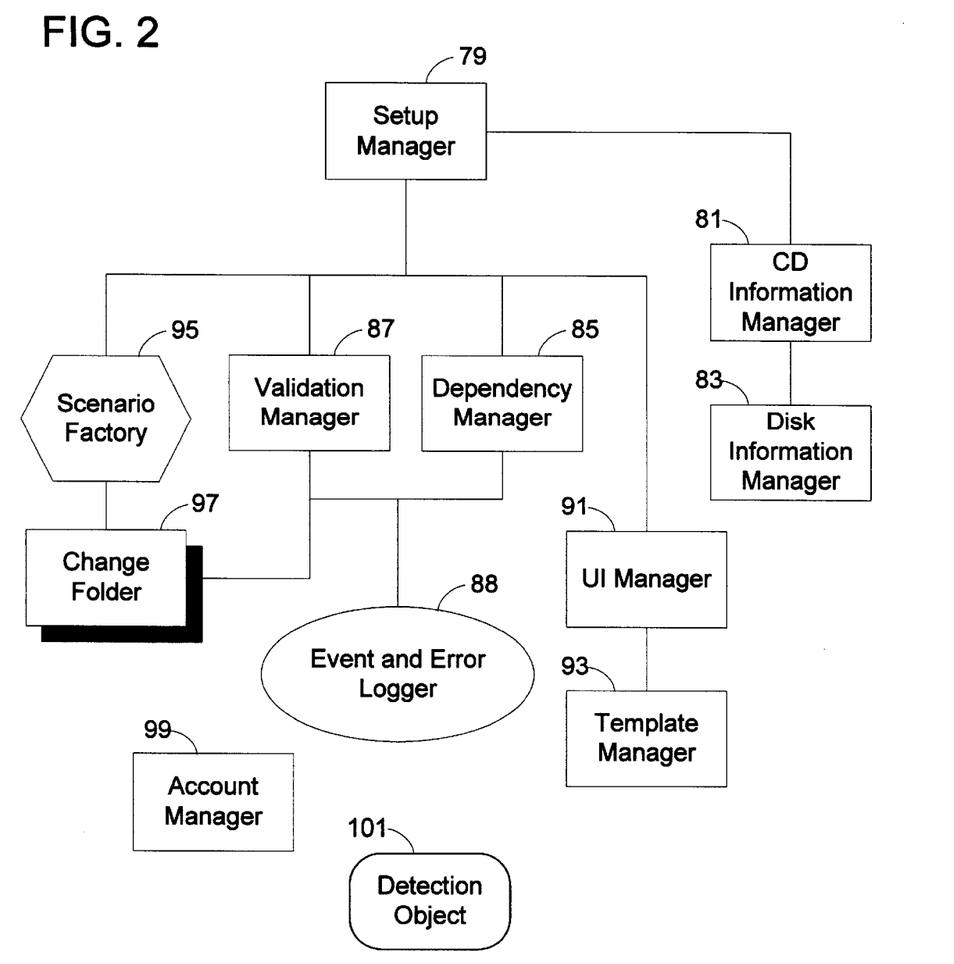
FIG. 2 is a simplified architectural block diagram of an embodiment of the Suite Integration Toolkit of the instant invention.

To gain a better appreciation of the SIT of the instant invention, attention is now directed to the simplified architectural block diagram of FIG. 2. While this FIG. 2 illustrates the SIT as functional blocks or objects, there is no intention to limit the scope of the invention to such blocks or objects, or to any particular technology or programming methodology. Instead, this simplified diagram is presented by way of illustration to aid in the understanding of the logical functionality of an aspect of the instant invention, and is not presented by way of limitation.

The SIT includes a Setup Manager 79 that drives the installation process through the setup.sdb files for the suite. CD 81 and Disk 83 Information Managers provide required information concerning file location, size, etc. for the suite CD(s) during the integration process, and for the user's system onto which the suite will be installed. During the installation process, the Setup Manager 79 utilizes the services of a Dependency Manager 85 to ensure that the required dependencies of the application programs within a suite are met. This ensures that the installation may proceed through each phase without error, and so that the application programs may run on the user's system once installed. A Validation Manager 87 is also used by the Setup Manager 79 to verify that required system components needed by the suite are met by the user's system for much the same reasons as for the Dependency Manager 85. If an error is determined during either of these checks, it is logged by an Event and Error Logger 89.

During the installation process, the Setup Manager 79 also employs the services of an UI Manager 91 to display the proper information to the user. This UI Manager 91 may utilize a Template Manager 93 if it wants to display standardized pages provided with the SIT. The UI Manager 91 may also display any customized pages identified in the setup.sdb file during the installation and setup of the suite. During this installation and setup, the SIT may utilize a Scenario Factory 95 to install only selected application programs or components from the suite as selected by a user or as pre-configured by the suite owner. The Change Folder 97 object is used to select the destination directories for applications. SIT may also employ an Account Manager 99 if required during the installation and setup process. The SIT 78 also includes a Detection Object 101.

While not specifically illustrated in FIG. 2, SIT may include an intermediate layer (dll) that will enable integration of an application program which relies on a different installation and setup technology (e.g., Install Shield) into the suite. This intermediate layer will wrap the application's installation technology and interface with SIT. During installation and setup, SIT will command the component or application to install, and the dll will launch the application's installation technology.

The installation and setup process of the instant invention is seamless from a user's perspective. The SIT determines all of the information requirements for each of the application programs to be installed. SIT then takes the superset of this information and builds the information queries for display to the user to collect the required information. This information is then distributed to each application that requires it, i.e. all applications have access to the collected information. In this way, a given piece of information is collected from a user only one time. If, however, a particular application does not accept that information or otherwise requires different or contrary data for the same piece of information, SIT generates an additional information screen, the information from which will be delivered only to the application that required the different data.

The installation process is actually divided into two primary stages: baseline and install. Baseline may include both a "suite" baseline and a "scenario" baseline, or the scenario baseline can be rolled into the suite baseline if desired. The install stage of the instant invention is divided into pre-install, install, and post-install actions on a component level as will be described in greater detail below. The Setup Manager 79 and UI Manager 91, two of the top-level objects of SIT, handle integration of the component installations and the UI. The Dependency Manager 85 provides dependency checking and install order calculation and verification across all selected components as mentioned above. Suite owners who want to make use of a pre-defined set of SIT UI templates can use the Template Manager 93 to load a Wizard 97 page, passing in the required information for that template. Alternately, suite owners who require custom UI can write their own dialogs that are hosted in a Wizard 97 frame (header w/title, description and small graphic and footer with navigation buttons). In both cases, components and/or scenarios handle validation and error reporting for any user input.

A baseline is a requirement determined by the suite owner. It concerns what OS and/or applications must be on a user's machine before installation of the suite can begin. Suite baseline denotes the actions necessary to get the machine to the required state for the installation of an application or suite. This may include installation of a required OS, any SPs, hot fixes, or additional applications necessary for the component or suite to install. Baseline install actions may or may not be visible to the user (i.e. install hot fixes as hidden components). By default, the UI Manager 91 displays start up screens to the user during this stage, including Welcome, Name/Organization, Password, product identification (PID), and end user license agreement (EULA). All startup screens can be shown/hidden as desired via a [Startup Sequence] section of the setup data file.

Each component must provide information on its (and any sub components) suite baseline requirements. If the suite baseline is not met for a component, any requirements beyond the suite baseline are considered part of the scenario baseline and are displayed to the user on the Scenario Baseline page. If the user chooses not to install the scenario baseline components, Setup Manager 79 prevents the installation of the affected component/sub components. If the setup is unattended (hence the user does not know if the suite baseline has not been met), baseline components are installed silently. If this is not possible (i.e. due to baseline component install restrictions or baseline component is not available), then a message is written out to the error log indicating why the install cannot proceed. If the setup is attended and the Welcome page has been turned off in the setup data file, the Welcome page will still appear if the suite baseline has not been met. If the suite is checking for but not installing baseline components, and the check indicates that the suite baseline has not been met, the user will not be allowed to click on Next in the Welcome screen.

Suite baseline components may have dependent components. If these dependent components have not been marked as suite baseline components, SIT sets them as baseline components and tries to install them. If SIT cannot install the dependent components (and hence the suite baseline component), SIT informs the user, logs the error, terminates installation of the component which has a missing dependency, and continues with the rest of the installation. This is similar to the "debug and release" methodology. In this way, the entire suite installation is not adversely affected by one failed component.

As an example of this dependency requirement and the resultant accommodations that SIT makes, consider a suite with Program A, Program B, and Program C included therein. Now assume that Program B is dependent on Program C, i.e. Program B needs Program C for proper operation. SIT will detect this dependency and will install Program C before Program B, even if this requires that the install order in setup.sdb be changed. If, for some reason, Program C cannot be successfully installed, or if Program C is simply not included on the suite CD or otherwise not available (SIT may look at other locations for applications to install, e.g. on a network, local machine, etc.), SIT will inform the user that a required dependency is missing, skip the installation of Program B, and continue with any other installations remaining for the suite. Alternatively, SIT may prompt the user for the install path if the dependency is missing.

As discussed above, a similar problem exists with regard to different versions of the same component required by different application programs. To illustrate, assume Program B requires Component version 1.0, and Program C requires Component version 2.5. Installation of Program C will result in Component version 2.5 being installed on the user's system first (since the dependency requirement between applications must be met as described above). The later installation of Program B would in the past result in the installation of Component 1.0, overwriting Component 2.5. After Program B was installed, prior installation technologies would need to go back and install Component 2.5 for a second time to overwrite the older version that overwrote it. This problem has been overcome with the instant invention. Specifically, SIT utilizes a concept called "shared components" to recognize this situation and install only the latest version of the Component needed by various applications. This greatly reduces the overhead of the installation process as each Component is installed only once, as well as reducing the complexity of the installation from the end-user's point of view.

SIT also supports a scenario baseline. In instances where a user selects a scenario from a Scenario Selection page that has a higher baseline than the entire suite (e.g. when a third-party adds a scenario and does not update the suite baseline), SIT first checks the scenario baseline for the selected scenario. Next, SIT informs the user if scenario baseline has not been met. By default, SIT provides the Scenario Baseline page that displays what components need to be on the user's machine and what components are currently installed, similar to the Welcome page used for communicating suite baseline requirements. The user can click Next to install the scenario baseline components and continue with the installation, click Cancel to exit setup, or click Back to select a different scenario. Finally, SIT installs the scenario baseline components if they are available.

Figure 3:
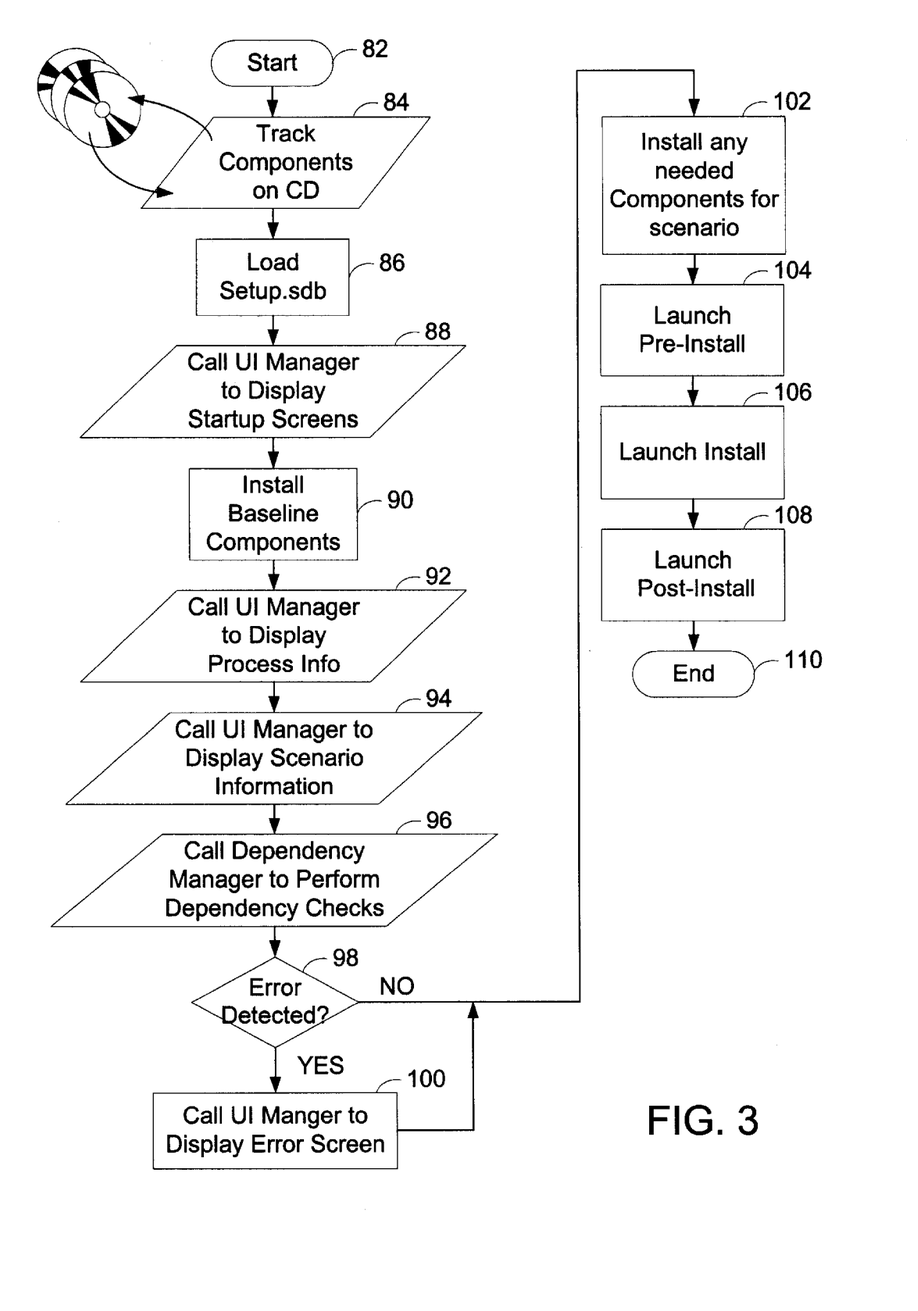
FIG. 3 is a simplified process flow diagram illustrating the setup management in accordance with a method of the instant invention.

With this basic understanding of installation process now in hand, attention is now directed to FIG. 3 for a more detailed explanation of the integration and installation process driven by the Setup Manager 79 of SIT. Once the Setup Manager has been initiated 82, it then acquires from the setup.sdb file information concerning where the component bits are located on the suite CDs (the CD layout) 84. It then loads 86 the setup data file (setup.sdb) that contains general installation information, including scenarios, display order of components, list of startup and finish screens, etc. The UI Manager of SIT is then called 88 to display the suite installation startup screens from which the UI Manager gathers and validates user input. The Setup Manager then installs 90 required baseline components, and calls 92 the UI Manager to display progress information during baseline install (preferably, progress will be displayed during silent baseline as well). The UI Manager is then called 94 to retrieve and display scenario information from components and/or from the [Scenarios] section in data file as discussed above.

Then, the Dependency Manager is called 96 to perform dependency checking among the components that user has selected. This dependency checking will be described more fully below. If any conflicts are detected 98, the UI Manager is called 100 to display a Dependency UI screen. The dependency UI will display what the perceived conflicts are and will allow the user to cancel the request which caused the problem, or to have SIT automatically set the Actions of the required components to a state which resolves the issue. Scenario data files provide a simple hook into setup for third-party users of the Setup Manager. The Setup Manager also installs 102, when necessary, components needed to achieve the scenario baseline if it differs from the suite baseline. This may occur, e.g., when a third party modifies a scenario data file, but neglects to modify the setup data file. As a result, the scenario baseline is no longer a subset of the suite baseline and requires the installation of additional components. The Setup Manager also launches pre-install 104, install 106, and post-install 108 loops and sends messages to components/sub components to perform actions during these installation stages before the process terminates 110.

Third-party calls into this setup process are also supported in the system of the instant invention. If desired, these third parties can hook in as the setup data file is loaded. As an example, the data file shipped with a suite can be modified and shipped on a third party supplied CD that is loaded first in the installation process. In this case, the Setup Manager will load the updated data file containing third-party product information as part of the startup. Alternatively, third parties can hook in after the suite baseline has been achieved by replacing/rewriting the scenario data file.

Figure 4A:
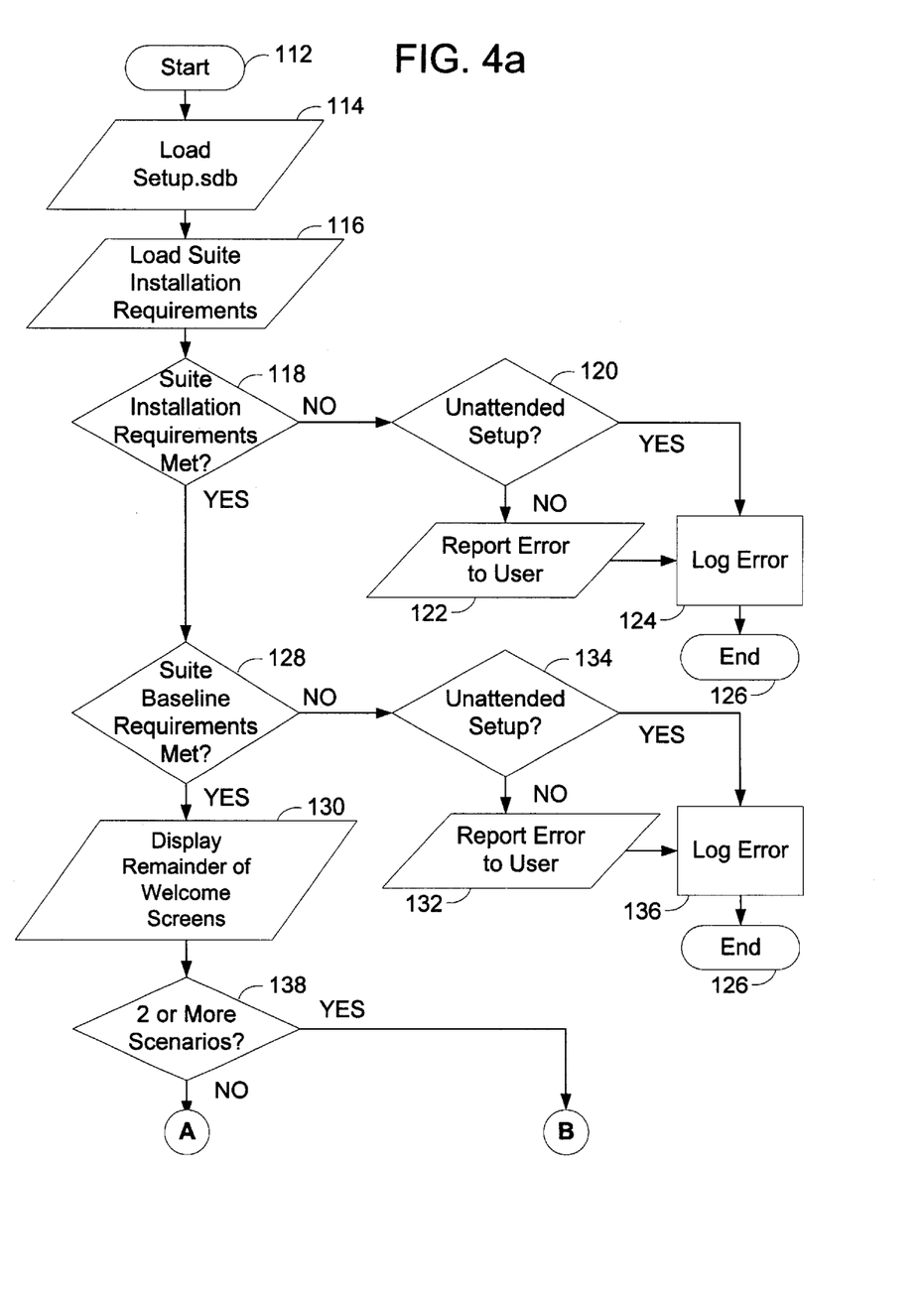
FIGS. 4a–c are simplified process flow diagrams illustrating the basic flow of a suite setup in accordance with a method of the instant invention.
Figure 4B:
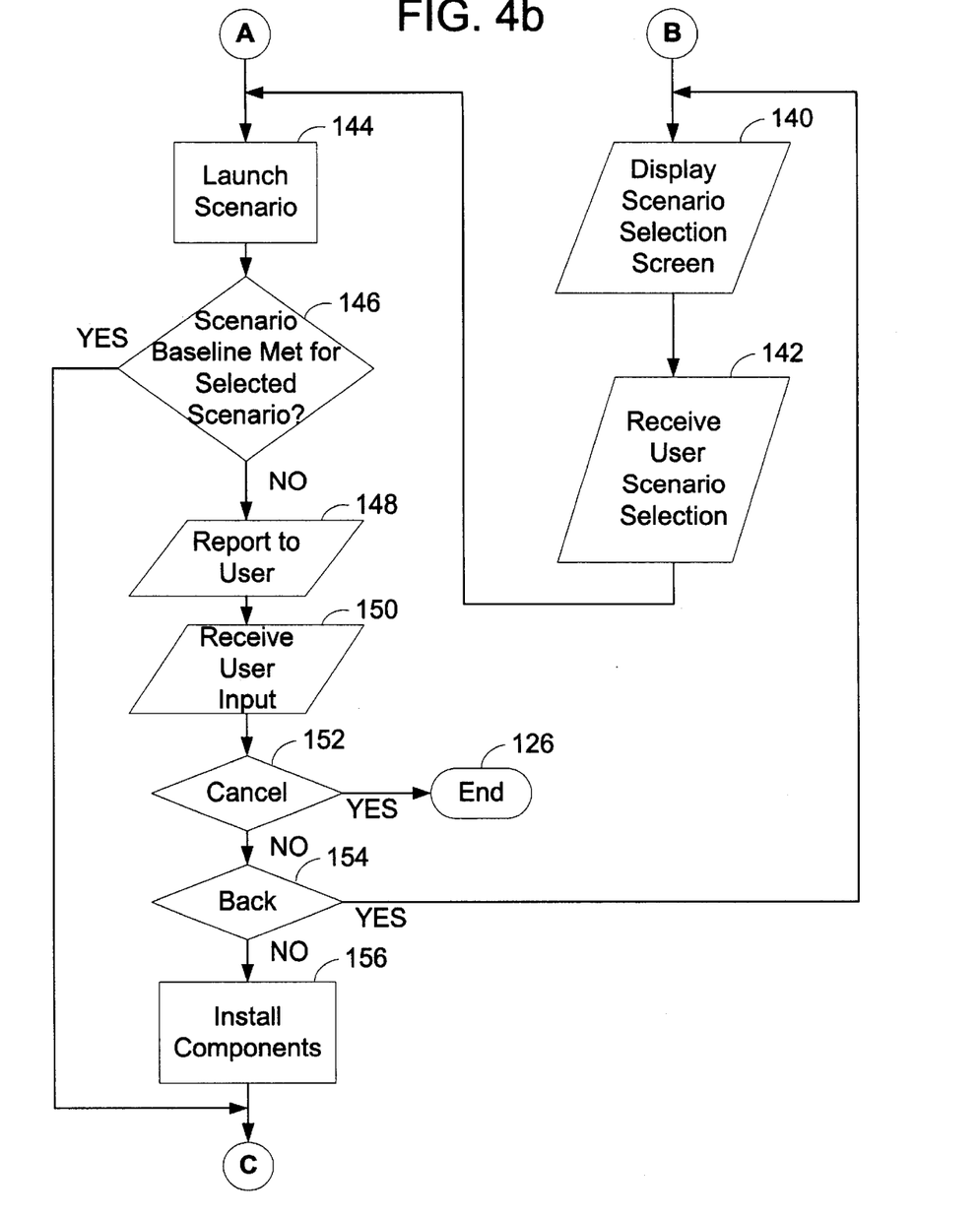
Figure 4C:
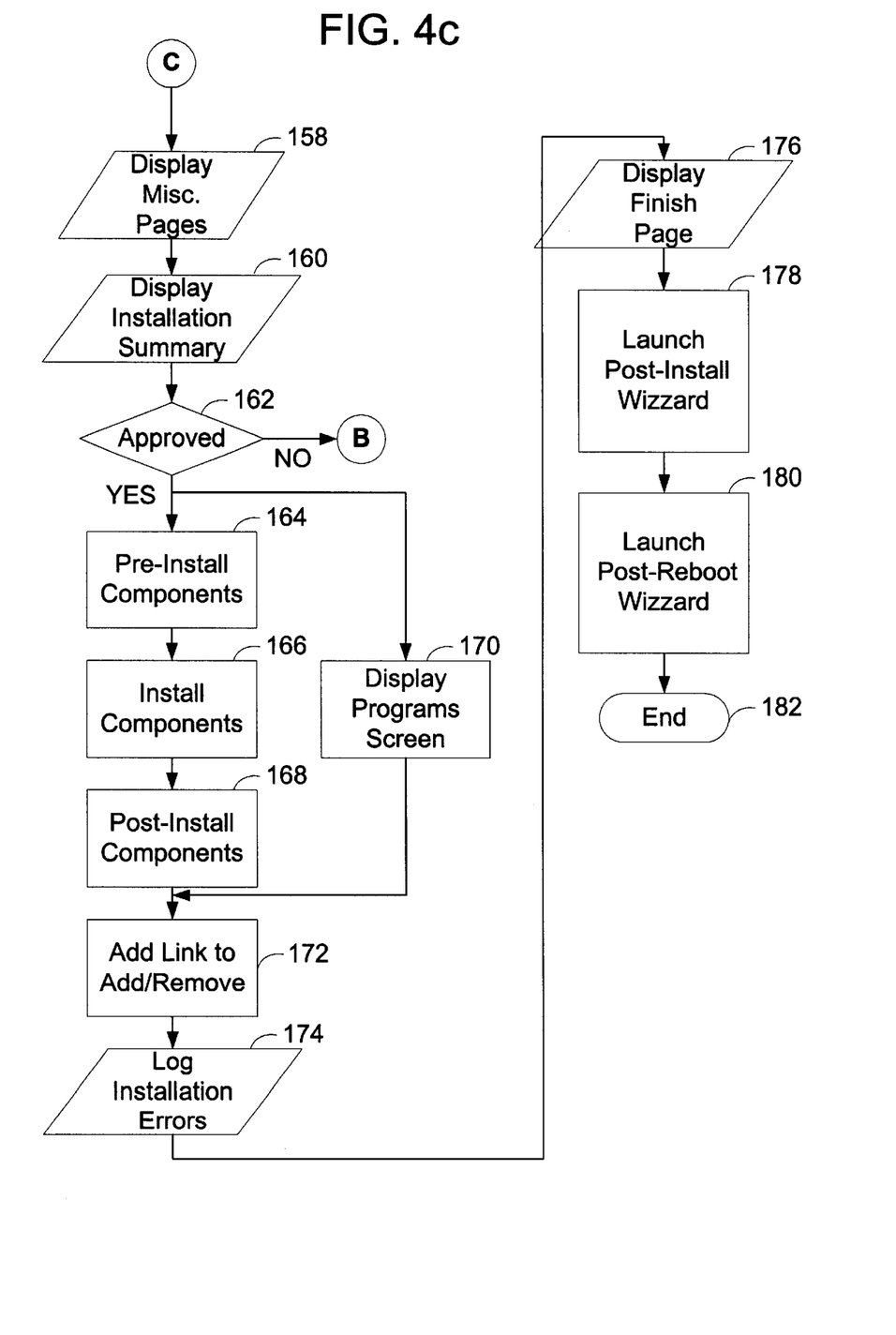

Turning now to FIGS. 4a–c, the basic flow of a suite setup is illustrated in greater detail. Once started 112, the setup.sdb file is loaded 114 as discussed above. If the setup data file is missing or cannot be loaded, a message box appears and informs the user of the problem. The suite installation requirements dynamic load libraries (dll) are then loaded 116 if specified, and a check is made 118 to determine if suite requirements have been met (i.e. RAM, processor, platform, pagefile, etc.). Insufficient suite requirements are reported to the user 122 via the Welcome screen, or an error is logged 124 and setup terminates 126 in the unattended case 120.

A check that the system meets the minimum requirements for the suite baseline is then performed 128. If the minimum requirements are not met, this is reported to the user 132. If the setup is unattended 134, the error is logged 136 and setup is terminated 126. Setting the custom property of all required suite baseline components can specify the suite baseline. This method is used when SIT is installing baseline components. The suite baseline can also be specified in the setup data file as indicated above. In such a case, SIT handles detection of the baseline, but the installation of baseline components is done outside of SIT.

Generally, suite baselines include OS, SPs, quick fix engineering or hot fixes (QFEs) (possibly as hidden components), Microsoft Data Access Components (MDAC), etc. The default Welcome page displays information about the user's machine and suite baseline components required, if any. Then the remainders of default startup screens are displayed 130. Preferably, all screens are optional, and may include Name/Organization, Password, product identification (PID), end user license agreement (EULA), AutoLogon, etc. Screens can be shown/hidden by adding/deleting the names of the screens in the [Startup Screens] section of the setup data file. A suite owner or third party can add their own UI at anytime in this sequence, or launch applications and/or processes during this sequence.

Next, if there are two or more scenarios 138, the scenario selection screen is displayed 140. This occurs once the suite baseline options have been satisfied and the startup screens (if specified), have been displayed. The screen displayed is the initial UI page specified in the scenario data file. On this page, users can choose 142 from a number of different pre-configured setups, or select Custom Scenario to completely customize the component or suite installation. If there is only one valid scenario available, that scenario is launched 144 without first displaying the Scenario Selection page. The scenario baseline based on the selected scenario is then checked 146. The user is informed 148 if the scenario baseline has not been met. By default, SIT provides the Scenario Baseline page that displays what components need to be on the user's machine and what components are currently installed, similar to the Welcome page used for communicating suite baseline requirements. The user can 150 click Next to install 156 the scenario baseline components and continue w/installation, click Cancel 152 to exit setup 126, or click Back 154 to select a different scenario.

The selected scenario may display a component selection page if users are given the option of selecting/deselecting components and sub components. The component selection page presents the user with a tree view containing all of the components and their sub components. From this view the user may select or deselect a component and set its installation directory. Users can also specify the setup action to be performed on each component or sub component (e.g. install, uninstall, add, recovery, no action). Version information and disk space requirements may also be displayed on this page. As users select and deselect the components or modify install actions on a component, full dependency checking is performed.

At this point in the setup, any components with additional UI requirements may present their UI pages 158. The default is to have custom UI pages for components appear in the order in which the components are listed in Component Selection page, although this may be changed as desired. Next, an installation summary is provided 160. All of the options and information the user has selected is displayed for final approval 162. Preferably, the user can navigate back to modify any of his or her selections from this screen.

Once the setup has been approved 162, the Setup Manager sends 164 a pre-install message to all components and all sub components as discussed above. The components have the option of prompting the user if they want to perform the pre-install action for a component. The suite owner can also specify pre-install actions by default and suppress user prompt. The Setup Manager then sends 166 an install message to all selected components and sub components. Next, the Setup Manager sends 168 a post-install message to all components and sub components. As with the pre-install, the components have the option of prompting user if they want to perform the post-install action for a component. The suite owner can also specify post-install actions by default and suppress user prompt.

During this process, an installation-progress page is provided 170. As SIT loops through pre-install components, install components, and post-install components as specified in the [Pre Install Order], [Install Order], and [Post Install Order] sections of the setup data file, the description text in the header of the progress screen updates with each change in install stage. This provides an indication of where in the process SIT is. SIT also adds a link 172 in the Add/Remove section of Control Panel. The name of the link corresponds to the suite name as specified in the [Product Information] section of the setup data file. Further, any installation errors encountered during the course of installation are logged 174 to a file specified in the [Error Log] section of the setup data file. A finish page is then displayed 176, and SIT writes out an unattend file for the completed setup.

Each component can launch 178 post-installation wizards or scripts, or perform any other desired post-install action. The suite can also specify a suite-wide wizard or script to be run, which can also be driven via the scenario. Each component may also specify an executable to run post-reboot 180. This can also be driven via the scenario. After these actions have been taken, as desired, the process is complete 182.

In accordance with the instant invention, the install stage comprises multiple phases, and in a preferred embodiment the invention comprises three phases including pre-install, install, and post-install phases. A fourth or optimization phase may also advantageously be included, or segregated from the post-install phase, if such optimization activity is significant or otherwise desirable to accomplish separate from the other post-install activities. Components and sub components can perform setup actions during any and all of these multiple stages. The installation system of the instant invention performs multiple installation loops during the install stage corresponding to each of the defined phases.

Figure 5:
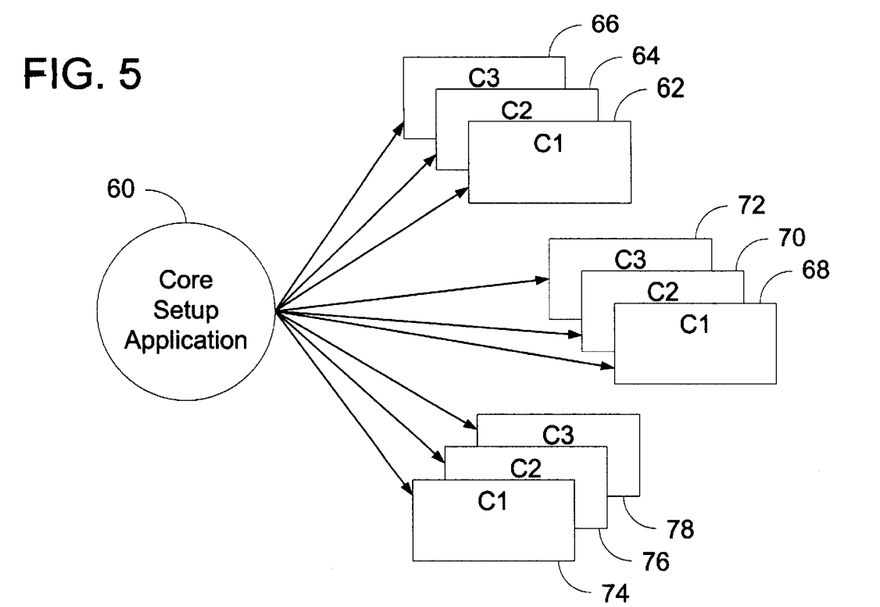
FIG. 5 is a simplified process diagram illustrating an aspect of the instant invention.

In an exemplary embodiment of the instant invention having three stages, the system first performs all of the pre-install actions, then all of the install actions, then all of the post-install actions. This interaction between the components that need to be installed and the core setup integration application is key. In a preferred embodiment of the invention, the components implement a specific component object model (COM) interface that contains a method, or function, for each installation and setup stage supported by that component. In an alternate embodiment, the component is queried for it's available setup stages. The SIT determines the installation order for the components, acquires the COM interface from the component and, for each install stage, calls the appropriate method on that interface. Each component's method for a given stage is called before any methods of any components for the next stage. This functional grouping and performance of install actions by stages is illustrated in FIG. 5. As may be seen from this simplified figure, the core setup application 60 first performs the pre-install actions 62, 64, 66 specified for each of the applications in the suite (in this example, three applications identified as C1, C2, and C3). Once the pre-install actions have been performed, the core setup application next performs the install actions 68, 70, 72 for each of the applications in the suite. Finally, the core setup application performs the post-install actions 74, 76, 78 for each of the applications in the suite.

Figure 6:
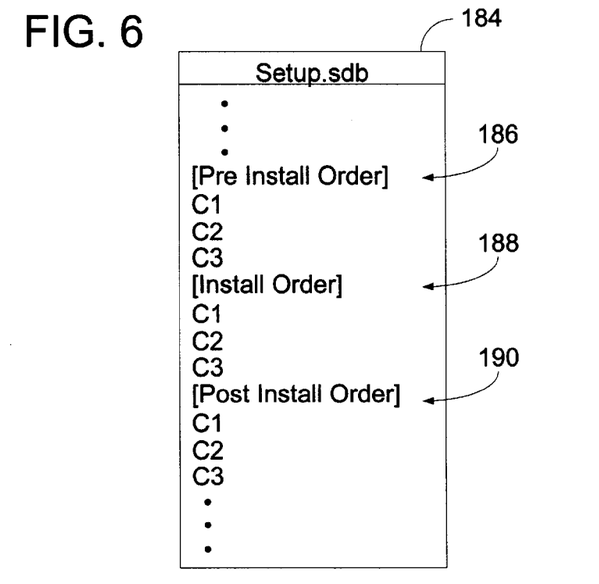
FIG. 6 is a simplified data structure diagram illustrating a portion of a setup database file constructed in accordance with the teachings of the instant invention.

These pre-install, install, and post-install actions may be specified in a setup data file (setup.sdb). While the organization and data structure of the setup.sdb file may take any standardized form containing the information required to properly install and setup the applications, a preferred embodiment of this data structure is illustrated in FIG. 6 to which specific reference is now made. The format of this setup database file 80 is preferably .ini or .inf file based. As illustrated, the setup database file 80 is essentially divided into a plurality of known, standardized sections into which is included the information for each application program. As will be recognized by one skilled in the art, these sections are not physically separated, but are merely segregated by proper section headings. For example, a setup.sdb file 80 in accordance with a preferred file structure includes at least sections 82, 84, and 86 for the specification of pre-install order, install order, and post-install order, respectively.

Specifically, application programs or other components with pre-install actions to perform are listed in the [Pre Install Order] section 82 of the setup data file 80. Likewise, applications or components with install actions to perform are listed in the [Install Order] section 84 of the setup data file 80, and components with post-install actions to perform as listed in the [Post Install Order] section 86 of the setup data file 80. During each of the install stage phases, an Installation Progress page is displayed having descriptive text that is updated to reflect which phase of install is occurring.

During the pre-install phase, a setup manager loops through all components/sub components that have pre-install actions and commands them to perform these actions. The order of pre-install actions is either (a) the display order as defined in the [Pre Install Order] section 82 of the setup data file 80, or (b) the order required by inter-dependencies between the components. The actual install order is used in all communication with the user (e.g. on Installation Progress, Confirmation or Installation Errors screens).

During the install phase, the setup manager sends install messages to all components/sub components. As with the pre-install phase, the order of install actions is either (a) the display order as defined in the [Install Order] section 84 of the setup data file 80, or (b) the order required by inter-dependencies between the components. In the latter case, the actual install order differs from the specified display order. The actual install order is used in all communication with the user (e.g. on Installation Progress, Confirmation or Installation Errors screens).

During the post-install phase, the setup manager loops through all components/sub components that have post-install actions and commands them to perform the actions (e.g. post-install wizards or utilities). The order of post-install actions is either (a) the display order as defined in the [Post-Install Order] section 86 of the setup data file 80, or (b) the order required by inter-dependencies between the components. In the latter case, the actual install order differs from the specified display order. The actual install order is used in all communication with the user (e.g. on the Installation Progress, Confirmation or Installation Errors screens). Post-installation actions (post-final reboot) can be specified in a [Finish Screens] section (not shown) of the setup data file 80. Any actions to occur post-reboot should appear after the Finish screen. If the finish screen is not enabled, then post-reboot actions appear as the final item(s) in the [Finish Screens] section.

Third party hooks for the finish sequence and post-reboot actions may also be included. These hooks may be in various forms, and may include, e.g., SE:[Filename/Address/etc.], which ShellExecutes the filename or the address (i.e. http:// or ftp:) specified. A CreateProcess hook in the form EXE, [Filename] for the filename specified may also be provided (e.g. EXE,c:\MyProg\someprog.exe). Other hooks may also be provided including, e.g., DLLCall:[Filename],[Function] (LoadLibrary, GetProcAddress, then run the specified function), HTMLPage:[Filename/Address/etc.] (displays a page consisting of a Wiz97 header (title and description text and bitmap), footer (navigation buttons), and a browser window containing the specified HTML page. This page can be local (i.e. on the CD), on a network drive, or an address (i.e. http://, ftp:) If an association for the specified filename does not exist, or the file specified does not exist, the UI Manager displays a blank rectangle in the wizard page. The IE control hosted in the page may display one or more errors related to the missing/incorrect page, but this information is not logged to the error log file.), and DLLPage:[Filename], [Function] (LoadLibrary, GetProcAddress, calls the specified function which returns an LPCPROPSHEETPAGE, then adds the page to the Wizard sequence). To specify post-install actions programmatically, the system of the instant invention provides AddToPostSetupLaunch and RemoveFromPostSetupLaunch methods to add or remove any of the post-install actions mentioned above.

To further aid in an understanding of the instant invention, an exemplary embodiment utilizing three install phases will now be described in greater detail. During the first or pre-install phase of the install stage, the system of the instant invention accomplishes all of the data gathering, file preparation, file availability and version checking, dependency checking for proper installation requirements, and the identification of any problems that may adversely impact the total installation process. In this way, once the pre-install phase is complete the system may proceed in an uninterrupted manner to install of the applications in the suite. As described briefly above, this installation may take several hours. By accomplishing all of the pre-install activities, there should be nothing that will halt this installation.

One of the first activities that may be accomplished during the pre-install phase is the collection of user information and desired configuration data. This process, in addition to or in association with automatic (default) information gathering that may be provided by SIT prior to the pre-install phase, determines all of the user input necessary for all of the applications to be installed, and collects all of this information during one or both of these phases. Questions and other user input that was previously required during the installation process, and which would halt the installation until a user input was received, are now all asked during one or both of these phases, or are blanked. One such question that previously halted installation part way through the suite installation until answered relates to the user's desire to continue with the installation due to amount of time that the next action was going to take to complete. Now, such a question may still be asked, although it will be presented at the end of the pre-install phase indicating that the install phase will proceed uninterrupted.

Another common problem that, in the past, halted the installation of a suite part of the way through was the realization by the installation system that a required file was missing. Unfortunately, this realization may not come until after several hundred megabytes of data have been installed. To preclude such an occurrence, the installation system of the instant invention may perform a file verification operation (file queuing) whereby the file requirements of all applications to be installed are determined. The pre-install phase then verifies that each of these files is present and non-corrupt. If any required files are found to be missing (or corrupted), the user is notified of the situation and asked to supply the missing file(s). The notification to the user also identifies the consequence of not supplying the required file, and asks if the use wants to proceed. As may be imagined, the consequence usually includes the inability to install at least one of the applications. If all of the required files are present, the system may proceed.

An activity that may be accomplished in the pre-install phase addresses the problem discussed above resulting from the installation of different versions of component or sub-component applications in prior installation methods. As may be recalled, this problem results from the installation of applications that are themselves mini-suites having sub-component applications. If two of the mini-suite applications use different versions of the same sub-component, the installation of both of the mini-suite applications may result in an old version of the sub-component over-writing a newer version.

To prevent this problem from occurring, the pre-install phase may perform a version check of all sub-components to be installed (or query for and receive the sub-component version information). If any version conflicts are identified, the pre-install phase may either mark the newer version of the sub-component as "read-only" thereby precluding the installation of the older version from writing over the newer, or it may simply command the install phase to install only the newer version of the sub-component. This second approach may be accomplished by modifying the setup.sdb file to specify the correct version, by replacing the older version with the newer, mapping the install command for the older version to the newer, etc.

The system of the instant invention also preferably performs dependency checking during the pre-install phase. This dependency checking addresses both the required dependencies for actual application installation, as well as any dependencies required for the pre-install activities. These dependencies may be the same or different between the pre-install and the install phases, and are driven by the application requirements and system configuration. For example, depending on what has been previously installed on a machine, the system may need to pre-install the applications in a different order from that which the system needs to install them. This allows the pre-install phase to set up their current versions for an upgrade in an opposite (or at least different) order than the install phase. Preferably, the dependency rules for the various install phases are provided by the applications themselves.

Once all of the pre-install actions have been completed, the system of the instant invention now enters the install phase. During this phase, all of the applications and their components and sub-components are installed on the user's system. This installation preferably proceeds without further user input or interaction until all of the applications are installed. As discussed above, a system installation status may be displayed for the user. Preferably, once the install phase completes all of the applications are fully installed and able to run on the user's system. A failure in any subsequent phase should not affect the operability of these applications, although their performance may be affected.

After the installation of all of the applications has completed, a preferred embodiment of the instant invention begins, or queries the user to begin, a post-install phase. This post-install phase performs many of the cleanup activities that are typically performed multiple times, at the end of each individual application's installation. This activity includes cleaning up temporary data generated during the installation, dumping configuration information to the active directory (AD), the running of optimization, performance, and various other wizards, and other summation type activities.

Depending on the suite that is being installed, this post-install phase presents significant advantages over the prior installation systems that cleaned up and optimized each application once it was installed, and then moved on to install another application, optimize it, install another, optimize, etc. Unfortunately, since other applications were being installed after an optimization wizard was run for another application, a very non-optimal system often resulted. For example, if an optimization wizard is run after each of the installations of Microsoft Exchange, SQL, and Proxy, the Exchange optimization does not know that SQL and Proxy will be installed, and therefore does not concern itself with the placement of the Exchange data. Unfortunately, if the Exchange data and the Proxy cache end up being installed on the same drive, system lock-up during heavy Internet usage, or severe performance degradation are the likely result. By segregating the optimization into the post-install phase and waiting to perform these functions until all of the applications have been installed, the system of the instant invention ensures total system optimization.

In the rare instance that something failed to install correctly or in such a way that it will not run, the post-install phase provides rollback capability. That is, the system of the instant invention automatically or via user selection, goes back and uninstalls the broken application so that the use's system does not have a lot of components and data installed that do not operate. The rollback capability allows the system to go back through pre-install for the problem application and mark files, and performs other preparatory activity for removal of the problem application and its components and sub-components.

The post-install phase may also, or alternatively, check for version problems with the installed components in the event that such problems were not, or could not be, addressed in the pre-install phase. If the post-install finds older versions of components installed than the version available, the system will go in and over write or otherwise update the older version with the newer. The application that installed the older version has the option of locking in the older version if required for some reason, in which case the system may still want to make the newer version available for applications that do not need the older.

A fourth or optimize phase is provided in an alternative embodiment of the instant invention. While the post-install phase described above typically runs the optimization wizards of the applications that have just been installed, it was realized that running only these optimizations may not result in total system optimization. Specifically, it was realized that a situation could arise where a group of applications are installed and optimized, and at a later time additional or different applications are installed. While these later applications will be optimized, their very installation may have disrupted the optimization of the prior applications. Therefore, in this optimization phase the system of the instant invention will automatically, or based on user selection, undertake to optimize the other applications that have been previously installed so that the entire user's system is optimized. This optimization may be global, or it may be limited to optimizing only those other applications from a particular suite that were installed previously.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of installing a suite of applications, comprising:
    identifying a plurality of installation phases;
    acquiring install actions for each of said plurality of installation phases for each of the applications in the suite that are to be installed; and
    performing all of said install actions for each of the applications in the suite that are to be installed for each of said plurality of installation phases before performing any of said install actions for any of said applications in the suite for a subsequent installation phase.

2. A method of installing a suite of applications, comprising:
    identifying a plurality of installation phases;
    acquiring install actions for each of said plurality of installation phases for each of the applications in the suite that are to be installed;
    performing all of said install actions for each of the applications in the suite that are to be installed for each of said plurality of installation phases before performing any of said install actions for any of said applications in the suite for a subsequent installation phase;
    wherein said step of identifying a plurality of installation phases comprises the steps of:
        defining a pre-install phase;
        defining an install phase; and
        defining a post-install phase.

3. The method of claim 2, wherein said step of performing all of said install actions comprises the steps of:
    performing all of said install actions for said pre-install phase for all of the applications in the suite that are to be installed; then
    performing all of said install actions for said install phase for all of the applications in the suite that are to be installed; and then performing all of said install actions for said post-install phase for all of the applications in the suite that are to be installed.

4. The method of claim 3, wherein said step of performing all of said install actions for said pre-install phase comprises the step of gathering all user input necessary for installation of the applications.

5. The method of claim 3, wherein said step of performing all of said install actions for said pre-install phase comprises the steps of:

creating a file queue of files required for proper installation of the applications to be installed; and determining availability of all of said files required for proper installation of the applications to be installed.

6. The method of claim 3, wherein said step of performing all of said install actions for said pre-install phase comprises the step of identifying dependencies between applications to be installed that may affect installation.

7. The method of claim 3, wherein said step of performing all of said install actions for said pre-install phase comprises the steps of:

determining a version number of all components required by the applications to be installed;

identifying instances of different version numbers of a particular component required by different applications to be installed; and marking the highest version of the particular component read-only.

8. The method of claim 3, wherein said step of performing all of said install actions for said install phase comprises the step of installing all of the applications to be installed without interruption.

9. The method of claim 3, wherein said step of performing all of said install actions for said post-install phase comprises the steps of cleaning up temporary data and running an optimization wizard.

10. The method of claim 2, wherein said step of identifying a plurality of installation phases further comprises the step of identifying an optimization phase.

11. The method of claim 10, wherein said step of performing all of said install actions comprises the steps of:

performing all of said install actions for said pre-install phase for all of the applications in the suite that are to be installed; then performing all of said install actions for said install phase for all of the applications in the suite that are to be installed; then performing all of said install actions for said post-install phase for all of the applications in the suite that are to be installed; and then performing all of said install actions for said optimization phase for all of the applications in the suite.

12. A computer-readable medium having stored thereon computer-executable instructions to perform the steps of:

acquiring install actions for a plurality of installation phases for each of a plurality of applications in a suite that are to be installed; and performing all of said install actions for each of the applications in the suite that are to be installed for each of said plurality of installation phases before performing any of said install actions for any of said applications in the suite for a subsequent installation phase.

13. A computer-readable medium having stored thereon computer-executable instructions to perform the steps of:

acquiring install actions for a plurality of installation phases for each of a plurality of applications in a suite that are to be installed;

performing all of said install actions for each of the applications in the suite that are to be installed for each of said plurality of installation phases before performing any of said install actions for any of said applications in the suite for a subsequent installation phase;

wherein said step of acquiring install actions for a plurality of installation phases comprises the steps of:
acquiring install actions for a pre-install phase;
acquiring install actions for an install phase; and
acquiring install actions for a post-install phase.

14. The computer-readable medium of claim 13, wherein said step of performing all of said install actions comprises the steps of:

performing all of said install actions for said pre-install phase for all of the applications in the suite that are to be installed; then performing all of said install actions for said install phase for all of the applications in the suite that are to be installed; and then performing all of said install actions for said post-install phase for all of the applications in the suite that are to be installed.

* * * * *